US006708188B1

(12) United States Patent
Bear et al.

(10) Patent No.: US 6,708,188 B1
(45) Date of Patent: Mar. 16, 2004

(54) EXTENSIBLE METHOD FOR OBTAINING AN HISTORICAL RECORD OF DATA BACKUP ACTIVITY (AND ERRORS) AND CONVERTING SAME INTO A CANONICAL FORMAT

(75) Inventors: Cory Bear, Bellevue, WA (US); Liam Scanlan, Bellevue, WA (US)

(73) Assignee: Bocada, Inc., Bellevue, WA (US)

( * ) Notice: Subject to any disclaimer, the term of this patent is extended or adjusted under 35 U.S.C. 154(b) by 367 days.

(21) Appl. No.: 09/665,270

(22) Filed: Sep. 19, 2000

(51) Int. Cl.[7] .............................................. G06F 17/30
(52) U.S. Cl. ...................................... 707/202; 707/204
(58) Field of Search ................................. 707/100, 202, 707/204; 711/162; 714/5

(56) References Cited

U.S. PATENT DOCUMENTS

| | | |
|---|---|---|
| 5,517,555 A | 5/1996 | Amadon et al. ............... 379/59 |
| 5,729,735 A | 3/1998 | Meyering .................... 395/610 |
| 5,754,782 A | 5/1998 | Masada ................. 395/200.43 |
| 5,758,359 A | 5/1998 | Saxon ......................... 707/204 |
| 5,796,999 A | 8/1998 | Azagury et al. ............. 395/600 |
| 5,813,017 A | 9/1998 | Morris ........................ 707/204 |
| 5,857,208 A | 1/1999 | Ofek ........................... 707/204 |
| 5,875,478 A * | 2/1999 | Blumenau ................... 711/162 |
| 5,890,165 A | 3/1999 | Boudrie et al. ............. 707/202 |
| 5,958,012 A | 9/1999 | Battat et al. ................ 709/224 |
| 5,974,563 A * | 10/1999 | Beeler, Jr. ....................... 714/5 |
| 6,006,227 A | 12/1999 | Freeman et al. ................ 707/7 |
| 6,026,414 A | 2/2000 | Anglin ........................ 707/204 |
| 6,035,412 A | 3/2000 | Tamer et al. .................... 714/6 |
| 6,038,379 A * | 3/2000 | Fletcher et al. ............. 709/230 |
| 6,038,569 A | 3/2000 | Beavin et al. .............. 707/203 |
| 6,289,380 B1 | 9/2001 | Battat et al. ................ 709/224 |
| 6,460,055 B1 * | 10/2002 | Midgley et al. ............. 707/204 |

OTHER PUBLICATIONS

International Search Report for International Patent Application No. PCT/US01/29435 filed Sep. 19, 2001.
International Search Report for International Patent Application No. PCT/US01/29434 filed Sep. 19, 2001.
International Search Report for International Patent Application No. PCT/US01/29521 filed Sep. 19, 2001.

* cited by examiner

*Primary Examiner*—Diane D. Mizrahi
(74) *Attorney, Agent, or Firm*—Gray Cary Ware & Freidenrich LLP

(57) ABSTRACT

An extensible method and system for obtaining an historical record of data backup activity (and errors) from a plurality of data backup software devices, and converting the same into a canonical format, is disclosed. In the first aspect, a method comprises the steps of providing a late-binding mechanism that provides the invention with extensibility so that it can be made to inter-operate with an arbitrary variety of backup software devices. In the second aspect, an interface for requesting and returning a canonical backup activity log is disclosed. In the third aspect, an interface for requesting and returning a canonical backup error log is disclosed. In the fourth aspect, the use of a canonical format enables the data to be cross-referenced, consolidated and compared.

55 Claims, 2 Drawing Sheets

EXTENSIBLE METHOD FOR OBTAINING AN HISTORICAL RECORD OF DATA BACKUP ACTIVITY (AND ERRORS) AND CONVERTING SAME INTO A CANONICAL FORMAT

CROSS REFERENCE TO RELATED APPLICATION

Patent Application of Liam Scanlan and Cory Bear METHOD FOR EXTRACTING AND STORING HISTORICAL RECORDS OF DATA BACKUP ACTIVITY FROM A PLURALITY OF BACKUP DEVICES Patent Application of Liam Scanlan and Cory Bear METHOD FOR VISUALIZING DATA BACKUP ACTIVITY FROM A PLURALITY OF BACKUP DEVICES

BACKGROUND—FIELD OF THE INVENTION

The present invention is related generally to electronic/software data backup and more particularly to simultaneous and seamless examination of such backup activity performed across a plurality of backup software devices.

FEDERALLY SPONSERED RESEARCH

No federally sponsored research was involved in the creation of this invention.

MICROFICHE APPENDIX

No microfiche has been submitted with this patent application.

BACKGROUND—DESCRIPTION OF PRIOR ART

Most data backup software devices in use today provide for the repeated, regular electronic transfer, over a network, of data from the point at which it is in regular use to a medium, such a magnetic tape, for the purposes of securing a fall-back situation should damage occur to the original data.

Included in the list of such software programs, are programs that work on relatively small amounts of data, sometimes on a one-computer-to-one-tape-drive basis, and others that work on very large amounts of data, with banks of tape drives that are used to back up data from potentially thousands of computers connected to a network.

Mostly, these data backup software products use what is known as a "client/server" model. In the context of data backup, this means that there is one computer (the "server") that controls and manages the actual data backup activity, and other computers (the "clients") that get backed up by the "server". In this scenario, the data backup tape drives are usually connected directly to the backup "server". There is also usually more than one backup server, each of which is responsible for the backup of data of numerous clients.

A central function of the activity of data backup is the ability to "restore" data in the case of damage to the data that is in use. The backup server computer usually controls this restore process. Understandably, the time it takes to recover data, and the confidence that the data recovery process will succeed, are two critical aspects of the data backup and restore function as a whole.

Disk drive capacities and data volumes, and consequently the volumes of data to be backed up, have historically been increasing at a greater rate than the backup server speed, tape drive capacity and network bandwidth are increasing to handle it.

Accordingly, new technologies have been added to help. Such new technologies include fiber-optic cables (for fast data transfer across the network), faster chips, tape drives that handle more tapes, faster tape drives, "Storage Area Networks" and so on.

The activity of data backup has become more and more critical, as the importance of the data has increased. At the advent of the desktop "revolution", that is, when people first started using personal computers (PCs), almost every piece of important data was still stored on one, single computer, possibly a mainframe or a minicomputer. As the numbers and types of computers proliferated, particularly on the desktop, and the purpose for which these desktops were now being used, making the data on such computers increasingly valuable, many different products designed to backup data were created and put into the marketplace. Now, there are some 50 or more data backup products in use by organizations and private individuals.

Generally, but not always, such data backup software devices (products) have a reputation for being difficult to use. When there is an exception to this, the data backup software product often has other, perhaps related, limitations (e.g. the amount of data is can back up is small).

Not all data backup software devices perform the same function. Thus, it is frequently necessary to have two or more different types of data backup software programs in use within the same organization, especially in large organizations. Anecdotally, one company has as many as 17 different data backup software devices in use somewhere in their organization. This is referred to as fragmentation.

In large organizations, is has become necessary to hire expensive expertise to manage such large data backup and restore services. The more varied their data backup devices, the more expensive this becomes. Also, for large organizations, it has become increasingly likely that scheduled data backup activities will fail. Because of the extra complexity of running a variety of data backup software devices, and because of the sheer number of data backup activities that need to take place regularly, failed data backups often go unnoticed in a sea of less-relevant data backup information.

An additional problem is that beyond a certain number of hours, perhaps minutes, if identifying a failed data backup takes too long, then it often becomes too late for meaningful corrective action to be taken. As a result, large organizations often take an expensive "best guess" approach. Anecdotally, the level of confidence that large organizations live with regarding data backup success is said to be about 80%. In other words, it is expected that no more that 4 out of 5 data backups will be successful. Almost every large organization will relate experiences where data was lost because they mistakenly believed the data was been backed up.

Also, a problem that is of increasing significance is the fact that there is currently no practicable means of charging $3^{rd}$ parties for data backup services rendered via most backup products, even though the sharp increase in organizations providing that service for pay is expected to continue.

Accordingly, what is needed is a means for quickly sifting through large numbers of data backup activities, in particular, across the activity of a plurality of data backup software programs, and to provide a uniform view of the those data backup activities, regardless of what data backup software product actually performed, or failed to perform, each backup.

Some backup products include reporting functionality that allows the administrative user to view historical records of backup activity. However, as each data backup product uses a notation that dissimilar from other data backup products, it is difficult or impossible to cross-reference or consolidate historical records of backup activity across a plurality of data backup products.

The consolidation of historical records of backup errors across a plurality of backup products is possible, to some extent, by using a general-purpose network management framework, like Computer Associates Unicenter. This type of product is typically designed to use the simple network management protocol (SNMP) to obtain errors from an arbitrary variety of computer programs across a network including data backup products. However, while general-purpose network management frameworks can consolidate errors, they do not provide a method to obtain historical records of data backup activity across a plurality of data backup products.

Accordingly, what is needed is a method for obtaining from a variety of different data backup software devices, an historical record of data backup activity suitable for the cross-referencing, consolidation and comparison of this data. An important aspect of this method is that it must include alingua franca or common notation for expressing an historical record of backup activity (and errors) and a convenient method or framework for combining software components that translate data obtained from a plurality of application programming interfaces (APIs) to the common notation. Another important aspect of this method is that it must be extensible so that it can be made to support additional backup software devices as the need arises by adding new modules but without requiring modification of the invention. The invention described in this document fulfils this requirements. It can then be used as an important component of software that analyses backup success and failures, generates billing reports and for other applications.

SUMMARY

In accordance with the present invention an extensible software component with the ability to interface to a plurality of backup engines for the purpose of obtaining historical records of data backup activity in proprietary notations and translating same to a canonical backup activity log and canonical backup error log. Those aspects of this ability that are entirely specific to a particular backup engine are derived from the use, by the invention, of a backup engine plug-in. Therefore, the interface between the invention and a backup engine plug-in is also described in this document.

DESCRIPTION—TERMS AND NOTATION

Figure 1:
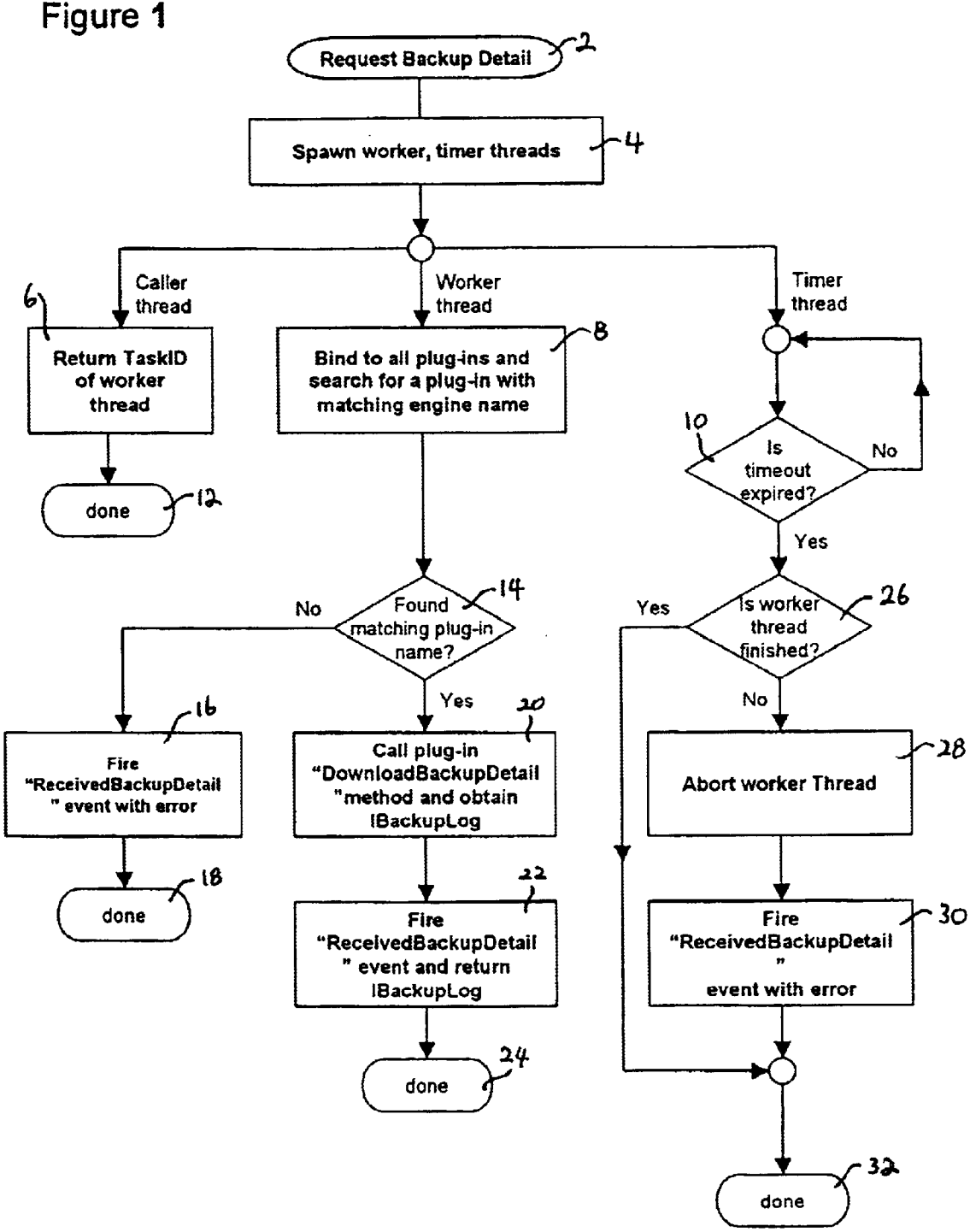
FIG. 1 is a flowchart illustrating the request backup detail method in accordance with the invention.

For the purpose of explanation, the following terms and conventions are used herein to describe embodiments of the invention.

a. The Term "Component Object Model" or "COM"

In this document there are several references to, and examples of, the term "component object model" (COM). COM is well-known technology that, among other things, provides support for late binding using either a dynamically-linked library (DLL) or remote procedure calls (RPC). In this context, the term "late binding" means that the COM allows software components to be added to a program during its normal operation that may not have been available when that program was originally compiled. Another related feature of COM is that it allows a program to be incorporated as a component into another program by means of integrated development environment (IDE) tool—a great convenience for software developers. All significant aspects of COM have been documented in books and magazines and are understood by those skilled in the art.

b. The Term "Interface Definition Language" or "IDL"

In this document there are several references to, and examples of, the term "interface definition language" (IDL). IDL is used to make a precise specification of a COM "interface". A COM interface is an object-oriented programming construct consisting of one or more methods (software procedures). A key aspect of a COM interface is that it is a concise way to define the input/output characteristics of a software component and how it can be connected to other software components and programs. Generally, a person skilled in the art will be able to fully implement a COM component based upon a specification of its COM interface, expressed in IDL, plus a sufficiently detailed description of the semantics of the methods in that COM interface.

There are several "versions" of IDL, but most versions are similar. In the preferred embodiment, the interface definition language used is the one supported by the MIDL.EXE compiler included with Microsoft Visual Studio Version 6.0. All significant aspects of IDL have been documented in books and magazines and are understood by those skilled in the art.

c. The Term "Plug-in"

In this document there are several references to, and examples of, the use of the word "plug-in". The use of this word in the context of this document is explained here.

Generally, software devices and programs may be built using multiple statically linked components like statically linked libraries and object files that are combined by a "linker". A linker is a software development tool that is commonly used by software developers but may not be available to end-users of a software product. Additional software components can be added to a statically linked program only by using a linker. However, a linker will not work while a program is in operation so the program must be stopped before the new components can be added. For example, early versions of the popular Unix operating system required the use of a linker in order to add new device drivers to the operating system kernel. One necessary consequence of this design was that Unix vendors were forced to bundle software development tools with the operating system in order to allow users to add new device drivers. Another unpleasant consequence was that the operating system had to be stopped (rebooted) in order to add new device drivers.

Alternatively, software devices and programs may be built which use dynamically linked components including dynamically linked libraries (DLLs), remote procedure call (RPC) and remote method invocation (RMI) technologies. The advantage of this approach is that new components can be added during the normal operation of a program and without using a linker. The use of COM is one way to implement dynamically linked components.

A "plug-in" is a dynamically linked software component that is used to add new functionality to an existing software device, typically because the new functionality could not be implemented at the time that the software device was originally created. For example, the popular Netscape Navigator browser software uses plug-ins to add new browser functionality because the designers anticipated that users would want to add new browser functionality after the product was shipped.

d. The Term "Backup Engine"

In this document there are several references to, and examples of, the term "backup engine". Generally, a backup engine is a part of a data backup product. It is a software device that runs backup jobs which backup (or copy) original data (known as a "backup target") to a storage area (known as the "backup media").

A key characteristic of a backup engine, with respect to the invention, is that it will contain or make available historical records of backup activity and errors. Generally, this information is expressed in a notation or data structure that is unique to the backup engine that uses it.

e. The Term "Canonical Backup Activity Log" or "CBAL"

In this document there are several references to, and examples of, the term "canonical backup activity log" (CBAL). A CBAL is a canonical notation for expressing historical records of data backup activity. In this context, the term "canonical" means that the notation is uniform, generic and consistent way to express these records irrespective of what backup engine the information is obtained from.

Generally, different backup engines will use dissimilar notation to express descriptions of backup activity, which tends to make it impractical or even impossible to cross-reference, consolidate or compare this information unless the information is first translated into a common notation. The canonical backup activity log (CBAL) was invented (as a key part of the invention described in this patent) to serve the purpose of a lingua franca and thus allow historical records of backup activity from a plurality of backup engines to be expressed in a common, consistent notation that is suitable for cross-referencing, consolidation and comparison.

A canonical backup activity log (CBAL) contains a list of "backup job" records. Each backup job record describes an attempt to by a backup engine to perform a data backup operation and contains information about the results of that operation. Specifically, a backup job record includes: the date that the backup attempt or operation took place; the proprietary and fully-qualified host name of the backup client; the number of bytes that were backed up (if any); the number of files (or objects) that were backed up (if any), the proprietary and canonical backup level names; a description of where the information in the backup job record was obtained; the number of seconds that elapsed during the backup operation (if any); the date and time that the backup will expire (if any); the logical target name; and the media label of the storage media that the backup is written to. Typically, the most essential information in a backup job record is the date that the backup attempt or operation took place; the fully-qualified host name of the backup client; and the number of bytes that were backed up (if any).

e. The Term "Canonical Backup Error Log" or "CBEL"

In this document there are several references to, and examples of, the term "canonical backup error log" (CBEL). A CBEL is a canonical format for expressing historical records of errors, warnings and events encountered by a backup engine during data backup operations. In this context, the term "canonical" means that the errors, warnings and events are expressed in a tabular format that is a uniform, generic and consistent way to express them irrespective of what backup engine the information is obtained from.

Generally, different backup engines will use dissimilar formats to express descriptions of backup errors, warnings and events, which tends to make it impractical to construct software devices that can display this information for a plurality of backup engines. The canonical backup activity log (CBEL) was invented (as a part of the invention described in this patent) to allow historical records of backup errors, warnings and events from a plurality of backup engines to be expressed in a common, consistent format.

g. The Term "BX"

In this document there are several references to, and examples of, the term "BX". BX is an acronym that stands for "Backup Report OCX" which is the name of the preferred embodiment. BX is a software component that may be added component. palette of an integrated development environment (IDE) like Microsoft Visual Basic or Borland Delphi, and thereby utilized in a software device or program. BX is an extensible method and system for obtaining an historical record of data backup activity (and errors) from a plurality of data backup software devices, and converting the same into a canonical format.

h. The Term "Backup Engine Plug-in" or "BEP"

A Backup Engine Plug-In (BEP) is a dynamically linked software component that is used to add the ability to communicate with a particular backup engine for the specific purpose of downloading historical records of data backup activity (and errors) from that backup engine. Generally, the preferred embodiment (BX) will use several BEPs in order to download historical records of data backup activity from a plurality of backup engines and convert these same records into a canonical backup activity log (CBAL). Similarly, BX also uses these BEPs in order to download historical records of data backup errors, warnings and events from a plurality of backup engines and convert these into a canonical backup error log (CBEL).

The preferred embodiment (BX) uses a plug-in approach because it is not possible to predetermine exactly how many backup engines (or versions of backup engines) will need to be supported in the future, or what the precise characteristics of these backup engines will be. The plug-in approach allows BX to be extended at a later date with support for additional products simply by adding new BEPs without the need to update or re-install the BX software.

An important aspect of the preferred embodiment (BX) is that it interfaces to a BEP using an interface that is sufficiently general to support the variety of requirements necessitated by the need to communicate with a plurality of backup engines. Key to this is the use of the CBAL, which is implemented, in the preferred embodiment as a COM interface named "IBackupLog". This COM interface essentially becomes the ingua franca for expressing and representing an historical record of data backup activity. Similarly, the CBEL is implemented in the preferred embodiment as a COM interface named "IBackupDetail". The key purpose of a BEP is to translate the data that is obtained from an application-programming interface (API) that is specific to a particular backup engine into a CBAL and CBEL.

DESCRIPTION—PREFERRED EMBODIMENT

As is often the case in a description of an object-oriented software program, in the discussion that follows the description of the data structures (in this case, the COM interfaces) precedes the discussion of the relevant procedures, algorithms and flowcharts.

a. Description of a COM Interface Named "IBackupLog"

In the preferred embodiment (BX), a canonical backup activity log (CBAL) is implemented as a COM interface named "IBackupLog". Considerable effort was required in order to invent an interface or notation that is sufficiently expressive yet concise enough to include only relevant data. The meaning and definition of "canonical backup activity log" (CBAL) was developed in conjunction with the development of the COM interface that implements it in BX.

The COM interface named "IBackupLog" is an interface to a data structure that contains a repository of historical records of data backup activity expressed as a CBAL. This data structure is implemented as an array of records such that each element in the array contains a backup job record. A backup job number, which ranges from zero to one less than the number of backup job records, is used to reference individual elements in the array.

The syntax of the COM interface named "IBackupLog" is described by an IDL specification as follows:

```
interface IBackupLog: IUnknown
{
    [id(1)] HRESULT CountBackupJobs([out, retval] int*
        pnBackupJobCount);
    [id(2)] HRESULT GetBackupDate([in] int
        nBackupJob, [out, retval] DATE* pdateBackedUp);
    [id(3)] HRESULT GetByteCount([in] int nBackupJob,
        [out, retval] double* pnByteCount);
    [id(4)] HRESULT GetCanonicalLevel([in] int
        nBackupJob, [out, retval] BSTR*
        pbstrCanonicalLevel);
    [id(5)] HRESULT GetClientName([in] int
        nBackupJob, [out, retval] BSTR* pbstrClientName);
    [id(6)] HRESULT GetDescription([in] int nBackupJob,
        [out, retval] BSTR* pbstrDescription);
    [id(7)] HRESULT GetElapsedTime([in] int
        nBackupJob, [out, retval] int* pnseconds);
    [id(8)] HRESULT GetErrorCount([in] int nBackupJob,
        [out, retval] int* pnErrorCount);
    [id(9)] HRESULT GetExpireDate([in] int nBackupjob,
        [out, retval] DATE* pdateExpires);
    [id(10)] HRESULT GetFileCount([in] int nBackupJob,
        [out, retval] int* pnFileCount);
    [id(11)] HRESULT GetFullyQualifiedName([in] int
        nBackupJob, [out, retval] BSTR* pbstrFqName);
    [id(12)] HRESULT GetLevelName([in] int
        nBackupJob, [out, retval] BSTR* pbstrLevelName);
    [id(13)] HRESULT GetLogicalTarget([in] int
        nBackupJob, [out, retval] BSTR*
        pbstrLogicalTarget);
    [id(14)] HRESULT GetMediaLabel([in] int
        nBackupJob, [out, retval] BSTR* pbstrMediaLabel);
}
```

The "CountBackupJobs" method returns an integer that represents the number of backup job records in the CBAL.

The "GetBackupDate" method returns the date and time of the backup operation. This is expressed as a floating point number that contains the number of days and fractional days since the epoch (Dec. 30, 1899), one of the standard date notations that is used with COM technology.

The "GetByteCount" method returns the number of bytes that were backed up as a floating point number (or zero if no bytes were backed up).

The "GetCanonicalLevel" method returns the canonical backup level of the backup operation. All backup operations are classified according to one of these canonical backup levels: "Archival", "Differential", "Full"; "Incremental"; and "Manual". The "Archival" backup level denotes a backup that is intended for archival purposes (that is, where the original is deleted and the backup copy is preserved indefinitely). The "Differential" backup level denotes a backup that is useful or meaningful only in the context of a prior "Full" backup (because it expresses a difference between the present version of the original data and a prior copy of that same data). The "Full" backup level denotes a full (or complete) backup. An "Incremental" backup level denotes a backup of only those files or objects that can be identified as having been modified since the last "Full" backup. A "Manual" backup level denotes a backup initiated by a user (in order to distinguish these backups from others that are initiated by an automated backup scheduler).

The "GetClientName" method returns the proprietary client name of the backup client that is involved in the backup operation. In the context, the word "proprietary" indicates that this client name is the host name of the backup client as it known to the backup engine. Often this is a host name is not fully-qualified. For example, the host name "Apollo" is not a fully-qualified host name. In this context, the term "fully-qualified" means that the host name is all lowercase and contains the Internet domain name. In some cases, but not all cases, the host name is fully-qualified. For example, "apollo.backupreport.com" is a fully-qualified host name. This inconsistency makes it difficult to cross-reference client names among a plurality of backup engines. Therefore, in order to cross-reference client names among a plurality of backup engines, the fully-qualified client name must be used and not the proprietary client name (note that the fully-qualified client name is obtained by using the "GetFullyQualified" method).

The "GetDescription" method returns the backup job description, typically a citation that is useful for finding out how the data in the backup job was obtained and where related information can be obtained from within the backup engine. The format of description can vary considerably and depends upon the backup engine. In some cases, the description may contain a reference number of a relevant record contained within a backup engine database. In other cases, it may contain a file name and line number of a flat file used by the backup engine to record relevant information.

The "GetElapsedTime" method returns the number of seconds that elapsed during the backup operation (or 1 if this information could not be obtained).

The "GetErrorCount" method returns the total number of errors and warnings that where identified by the backup engine during the backup operation (or –1 if this information could not be obtained).

The "GetExpireDate" method returns the date and time that the backup will expire, or the epoch (Dec. 30, 1899) if this information could not be determined. This date and time is expressed in the same notation used by the "GetBackupDate" method. Generally, backup copies expire after a few weeks when the backup media needs to be re-used in order to make newer backup copies.

The "GetFileCount" method returns the number of files (or objects) that were backed up during the backup operation (or –1 if this information could not be obtained).

The "GetFullyQualifiedName" method returns the fully-qualified host name of the backup client. In this context, the term "fully-qualified" means that the host name is all lowercase and contains the Internet domain name. For example, "Apollo" is not a fully-qualified host name but "apollo.backupreport.com" is a fully-qualified host name.

The "GetLevelName" method returns the proprietary backup level of the backup operation. Generally, backup engines will classify backup operations with a proprietary level name. In this context, the adjective "proprietary" is used to indicate that the backup level names used are expressed in a notion unique to a particular backup engine.

The meaning of a particular word when used as a proprietary backup level name can vary considerably and depends upon the backup engine. In some cases, different words or used for similar meanings. For example, some backup engine vendors will design their backup engine to use the word "normal" in a context where a different backup engine vendor might use the word "full". Therefore, in order to cross-reference backup level namesamong a plurality of backup engines, the canonical backup level must be used and not the proprietary backup level.

The "GetLogicalTarget" method returns the logical target name, a description of what files or objects are being backed up. The logical target is often a directory or file name, e.g. "C:\Foo". In some cases, the logical target is a mnemonic string or name that denotes a collection of directories and files.

The "GetMediaLabel" method returns the media label, a name or string that uniquely identifies a particular tape (or backup volume) that the backup copy was written to.

b. Description of a COM Interface Named "IBackupDetail"

In the preferred embodiment (BX), a canonical backup error log (CBEL) is implemented as a COM interface named "IBackupDetail". The meaning and definition of "canonical backup error log" (CBEL) was developed in conjunction with the development of the COM interface that implements it in BX.

The COM interface named "IBackupDetail" is an interface to a data structure that contains a repository of historical records of data backup errors, warnings and events expressed as a CBEL. This data structure is implemented as a table of rows and columns, where each column has a title that describes it. A 2-dimensional array of elements is used for the table; a 1-dimensional array of strings is used for the titles; and a 1-dimensional array of integers is used for the column types. All elements in the table are stored using a string data type because a string can be readily converted either into an integer or date and time, as is required by the interface. A column number, which ranges from zero to one less than the number of columns, and a row number, which ranges from zero to one less than the number of rows, is used to reference individual elements in the table.

The syntax of the COM interface named "IBackupDetail" is described by an IDL specification as follows:

```
interface IBackupDetail: IUnknown
{
    [id(1), helpstring("method CountColumns")]
        HRESULT CountColumns([out, retval] int*
        pnColumnCount);
    [id(2), helpstring("method CountRows")] HRESULT
        CountRows([out, retval] int* pnRowCount);
    [id(3), helpstring("method GetColumnTitle")]
        HRESULT GetColumnTitle([in] int nColumn, [out,
        retval] BSTR* pbstrTitle);
    [id(4), helpstring("method GetColumnType")]
        HRESULT GetColumnType([in] int nColumn, [out,
        retval] int* pnColumnType);
    [id(5), helpstring("method GetDateValue")]
        HRESULT GetDateValue([in] int nRow, [in] int
        nColumn, [out, retval] DATE* pdateValue);
    [id(6), helpstring("method GetNumericValue")]
        HRESULT GetNumericValue([in] int nRow, [in] int
        nColumn, [out, retval] int* pnValue);
    [id(7), helpstring("method GetStringValue")]
        HRESULT GetStringValue([in] int nRow, [in] int
        nColumn, [out, retval) BSTR* pbstrValue);
}
```

The "CountColumns" method returns the number of columns in the CBEL.

The "CountRows" method returns the number of rows in the CBEL.

The "GetColumnTitle" method returns a string that contains the title or caption that describes the column.

The "GetColumnType" method returns an integer that describes the preferred data type of elements in the column. The term "preferred" in this context indicates that certain data is best returned using a particular data type. For example, it is typically best to return an element that contains a date and time using a data type appropriate to time stamps, in order to leverage standard program libraries and internationalization tools. If the column is best returned as a date an time, the column type is 2; if the column is best returned as a number, the column type is 3; if the column is best displayed as a string, the column type is 6.

The "GetDateValue" method returns the value of an element in the form of a floating point number that contains the number of days and fractional days since the epoch (Dec. 30, 1899), one of the standard date notations that is used with COM technology. This method is to be used only when the column type indicates that the element contains a date and time.

The "GetNumericValue" method returns the value of an element in the form of an integer. This method is to be used only when the column type indicates that the element contains a number.

The "GetStringValue" method returns the value of an element in the form of a string. Any element can be expressed as a string, but it is usually best to use the "GetDateValue" method if the column type indicates that the element contains a date and time. Similarly, it is usually best to use the "GetNumericValue" method if the column type indicates that the element contains a number.

c. Description of a COM Interface Named "IBeProps"

In order to communicate with a backup engine, it is sometimes necessary to have knowledge of certain properties that are specific to that backup engine. In this context, the word "property" is used to mean a (name, value) tuple used as a parameter. For example, "login name", "password", and "TCP/IP port number" are the names of properties that are typically found property list.

The COM interface named "IBeProps" is an interface to a data structure that contains a list of backup engine properties. This data structure is implemented as a 1-dimensional array, where each element of the array contains a property name and a property value. The property name and property value are both expressed using a string data type. A property number, which ranges from zero to one less than the number of properties in the array, is used to reference individual properties.

The syntax of the COM interface named "IBeProps" is described by an IDL specification as follows:

```
interface IBeProps: IUnknown
{
    HRESULT CountProperties([out, retval] int*
        pnProperties);
    HRESULT GetPropertyName([in] int nProperty,
        [out, retval] BSTR* pbstrPropertyName);
    HRESULT GetPropertyValue([in] int nProperty,
        [out, retval] BSTR* pbstrPropertyValue);
```

The "CountProperties" method returns an integer that represents the number of properties.

The "GetPropertyName" method returns a string that contains the name of a property.

The "GetPropertyValue" method returns a string that contains the value of a property.

d. Description of a COM Interface Named "IBePlug"

A Backup Engine Plug-In (BEP) is a software component that is used to add the ability to communicate with a particular backup engine for the specific purpose of downloading historical records of data backup activity (and errors) from that backup engine. The COM interface named "IBePlug" is the mechanism by which the preferred embodiment (BX) accesses a backup engine plug-in (BEP). The use of a standard interface in this manner allows BX to be designed without knowledge of the implementation of a BEP, and vice versa.

A backup engine plug-in (BEP) obtains historical records of backup activity (and errors) from application-programming interface (API) that is specific to a particular backup engine. In this context, the term "application-programming interface" denotes programming libraries supplied by the backup engine vendor; files generated by the backup engine in the course of its normal operation; command-line utilities included with the backup engine that can be run to produce relevant data; or any other software method that can be used to obtain the relevant data.

A backup engine plug-in (BEP) will translate the historical records of backup activity (and errors) obtained from a backup engine into a canonical backup activity log (CBAL) and canonical backup error log (CBEL). For example, some backup engines express dates and times in the Unix date format, a 32-bit integer that contains the number of milliseconds since an epoch of Jan. 1, 1970. This date format must be translated into the date format used in the canonical backup activity log (CBAL), a floating-point number that contains the number of days (including fractional days) since an epoch of Dec. 30, 1899. Similarly, some backup engines will express the number of bytes that have been backed up in kilobytes or megabytes, and this must be translated into the date format used in the CBAL. In general, the BEP will perform whatever translation is necessary in order to put the data into a format used in the CBAL.

The syntax of the COM interface named "IBePlug" is described by an IDL specification as follows:

interface IBePlug: IUnknown
{
   HRESULT DownloadBackupDetail([in] BSTR
     bstrServerName, [in] BSTR
     bstrClientName, [in] DATE dateBackedUp, [in]
     IBeProps2000* serverProps, [out, retval] IBackup-
      Detail**
     ppIBackupDetail);
   HRESULT DownloadBackupLog([in] BSTR
     bstrServerName, [in] DATE
     dateFrom, [in] IBeProps2000* serverProps, [out,
      retval]
     IBackupLog2000** ppIBackupLog);
   HRESULT GetEngineName([out, retval] BSTR*
     pbstrEngineName);
};

The "DownloadBackupDetail" method returns a canonical backup error log (CBEL) expressed as a COM interface named "IBackupDetail". The backup engine plug-in (BEP) will use the application programming interface (API) of the backup engine to obtain an historical record of backup errors, warnings and events and then will translate the same into a CBEL.

The "DownloadBackupLog" method returns a canonical backup activity log (CBAL) expressed as a COM interface named "IBackupLog". The backup engine plug-in (BEP) will use the application programming interface (API) of the backup engine to obtain an historical record of backup activity and then will translate the same into a CBAL.

The "GetEngineName" method returns a string that contains the name of the kind of backup engine that the backup engine plug-in (BEP) can communicate with.

e. Description of a COM Interface Named "IBackupReport"

The COM interface named "IBackupReport" is used to access the functionality of the preferred embodiment (BX). BX is a software component that may be added component palette of an integrated development environment (IDE) like Microsoft Visual Basic or Borland Delphi, and thereby utilized in a software device or program. A programmer would use BX in combination with an IDE to create a new software device or program. The program would access BX via the COM interface named "IBackupReport", and more specifically via the "RequestBackupDetail" and "RequestBackupLog" methods. In the course of using these two methods, other COM interfaces would like "IBackupDetail", "IBackupLog", etc., also come into play, hence these interfaces are also described in this document.

Given the name of a backup engine and backup server, BX will return an historical record of data backup activity (and errors) expressed as a canonical backup activity log (CBAL) and canonical backup error log (CBEL). Thus, the format of the data returned is consistent regardless of what backup engine the data is obtained from, which allows the data to be cross-referenced, consolidated and compared.

The syntax of the COM interface named "IBackupReport" is described by an IDL specification as follows:

interface IBackupReport: IDispatch
   HRESULT RequestBackupDetail([in] int
     timeoutMillisecs,
     [in] BSTR engineName, [in] BSTR serverName,
     [in] BSTR clientName, [in] DATE bkupDate,
     [in] IBeProps2000* serverProps,
     [out, retval] int* pTaskID);
   HRESULT RequestBackupLog([in] int
     timeoutMillisecs,
     [in] BSTR engineName, [in] BSTR serverName,
     [in] DATE fromDate,
     [in] IBeProps2000* serverProps,
     [out, retval] int* pTaskID);
};

The "RequestBackupDetail" method has five parameters: an integer that represents the number of milliseconds before the method will time out; a backup engine name; a backup server name; the date (24-hour day) that the errors, warnings, and events were generated by the backup engine; and a list of backup server properties. The "RequestBackupDetail" method has one return value: a task identification number.

The parameter named "timeoutMillisecs" is the number of milliseconds before the method will time out (the method is allowed only a limited period of time to complete successfully or it must abort on the grounds that the time out period has expired).

The parameter named "engineName" is a string of letters that contains a backup engine name, and thus uniquely identifies a backup engine. The backup engine name is used to find a backup engine plug-in (BEP) that is capable of communicating with the backup engine. For example, "NetVault" is a backup engine name.

The parameter named "serverName" is a string of letters that contains a backup server host name, and thus uniquely identifies which computer on the network is running the backup engine. For example, "apollo.backupreport.com" is a host name.

The parameter named "bkupDate" is a floating-point number that contains the number of days (including fractional days) since the epoch (Dec. 30, 1899). This is one of the standard date notations used with COM. Only those errors, warnings and events from the specified day will be returned (that is, the 24-hour hour period from midnight to midnight that includes the specified date and time).

The parameter named "serverProps" is a repository of relevant backup server parameters expressed using a COM interface named "IBeProps". This COM interface is described elsewhere in this document.

The return value named "pTaskID" is a number that contains a task identification code. A task identification code is a unique number that the operating system uses to name the "worker thread" that performs the "RequestBackupDetail" task. The operation and worker thread for the "RequestBackupDetail" task are explained elsewhere in this document in connection with the description of the flowchart shown in FIG. 2.

The "RequestBackupLog" method has five parameters: an integer that represents the number of milliseconds before the method will time out; a backup engine name; a backup server name; the "from date" (earliest date of interest); and a list of backup server properties. The "RequestBackupLog" method has one return value: a task identification number.

The parameter named "fromDate" is a floating-point number that contains the number of days (including fractional days) since the epoch (Dec. 30, 1899). This is one of the standard date notations used with COM. Only those historical records of backup activity that occurred on or after this date and time will be returned when BX fires the "ReceivedBackupLog" event.

The other parameters of "RequestBackupLog" and return value have descriptions identical to those of the "RequestBackupDetail" method. The operation and worker thread for the "RequestBackupLog" task are explained elsewhere in this document in connection with the description of the flowchart shown in FIG. 2.

f. Description of a COM Interface Named "_IBxOutputEvents"

The COM interface named "_IBxOutputEvents" is used, in the preferred embodiment (BX), to return the results of the asynchronous requests made using the COM interface named "IBackupReport". A software device or program that uses BX must implement handlers for these events in order to receive the values returned in this way.

```
dispinterface _IBxOutputEvents
{
    properties:
    methods:
    HRESULT ReceivedBackupDetail([in] int taskID,
        [in] int errorcode,
        [in] BSTR errorDetailString,
        [in] BSTR engineName, [in] BSTR serverName,
        [in] BSTR clientName, [in] DATE bkupDate,
        [in] IBackupDetail* backupDetail);
    HRESULT ReceivedBackupLog([in] int taskID,
        [in] int errorCode, [in] BSTR errorDetailString,
        [in] BSTR engineName, (in] BSTR serverName,
        [in] DATE fromDate,
        [in] IBackupLog* backupLog);
};
```

The "ReceivedBackupDetail" event has eight parameters: an integer that contains the task identification number returned by the corresponding call to the "RequestBackupDetail" method; an integer that contains zero for success or non-zero for an error; an error detail string that contains helpful details about an error; the backup engine name that was passed to the corresponding call to the "Request3ackupDetail" method; the backup server name that was passed to the corresponding call to the "RequestBackupDetail" method; the backup date and time that was passed to the corresponding call to the "RequestBackupDetail" method; and the canonical backup error log expressed using a COM interface named "IBackupDetail" that is described elsewhere in this document. The "ReceivedBackupDetail" event is fired when the "worker thread" initiated by the "RequestBackupDetail" method has completed, this is described elsewhere in this document in connection with the description of the flowchart in FIG. 1.

The "ReceivedBackupLog" event has eight parameters: an integer that contains the task identification number returned by the corresponding call to the "RequestBackupLog" method; an integer that contains zero for success or non-zero for an error; an error detail string that contains helpful details about an error; the backup engine name that was passed to the corresponding call to the "RequestackupLog" method; the backup server name that was passed to the corresponding call to the "RequestBackupLog" method; the from date and time that was passed to the corresponding call to the "RequestBackupLog" method; and the canonical backup activity log expressed using a COM interface named "IBackupLog" that is described elsewhere in this document. The "ReceivedBackupLog" event is fired when the "worker thread" initiated by the "RequestBackupLog" method has completed, this is described elsewhere in this document in connection with the description of the flowchart in FIG. 2.

g. Description of the Flowchart Shown in FIG. 1.

The flowchart shown in FIG. 1 is a description of how, in the preferred embodiment (BX), the "RequestBackupDetail" method works and how the "ReceivedBackupDetail" event is fired. The following text is an explanation of this flowchart.

When the "RequestBackupDetail" method is called, BX spawns two threads, a "worker" thread and a "timer" thread. It then returns the task identification number of the "worker" thread. This task identification number is used as a unique reference number that is intended to match a call to the "RequestBackupDetail" method with a "ReceivedBackupDetail" event (in case there is more than one call to the method, and there is confusion over which event corresponds to which call). In any case, the task identification number is set to unique thread identification number of the "worker" thread, which is easily obtained from the operating system.

As shown in the flowchart, simultaneous with the other threads of execution, the "timer" thread waits until time out period, specified in a parameter to the "ReceievedBackupDetail" method, has expired. When this happens, the timer thread aborts the "worker" thread if it has not already completed. If the worker thread is aborted, the "ReceievedBackupDetail" event is fired with the error code parameter set to a non-zero value (to indicate that the request failed).

As shown in the flowchart, simultaneous with the other threads of execution, the "worker" thread accomplishes the major purposes of the request. First, it searches for a backup engine plug-in (BEP) that supports the backup engine name specified in a parameter to the "RequestBackupDetail" method. To do this, it looks in the directory where BX is installed, which can be determined from the operating system, and then it examines all files therein that are that are named with a ".BEP" suffix. For each of these files, the file is treated as a dynamically-linked library, and an attempt is made to connect with a COM interface named "IBePlug". If this attempt is successful, and if the "GetEngineName" method of the COM interface named "IBePlug" then returns a backup engine name that matches the desired backup engine name, the BEP is found. Once the BEP has been found, all that remains is to call the "DownloadBackupDetail" method, take the canonical backup error log (CBEL) thereby obtained in the form of a COM interface named "IBackupDetail", and then fire the "ReceivedBackupLog" event with a zero error code to return this CBEL. However, in the case that the BEP is not found, then the "ReceivedBackupDetail" method is fired with a non-zero error code.

h. Description of the Flowchart Shown in FIG. 2.

Figure 2:
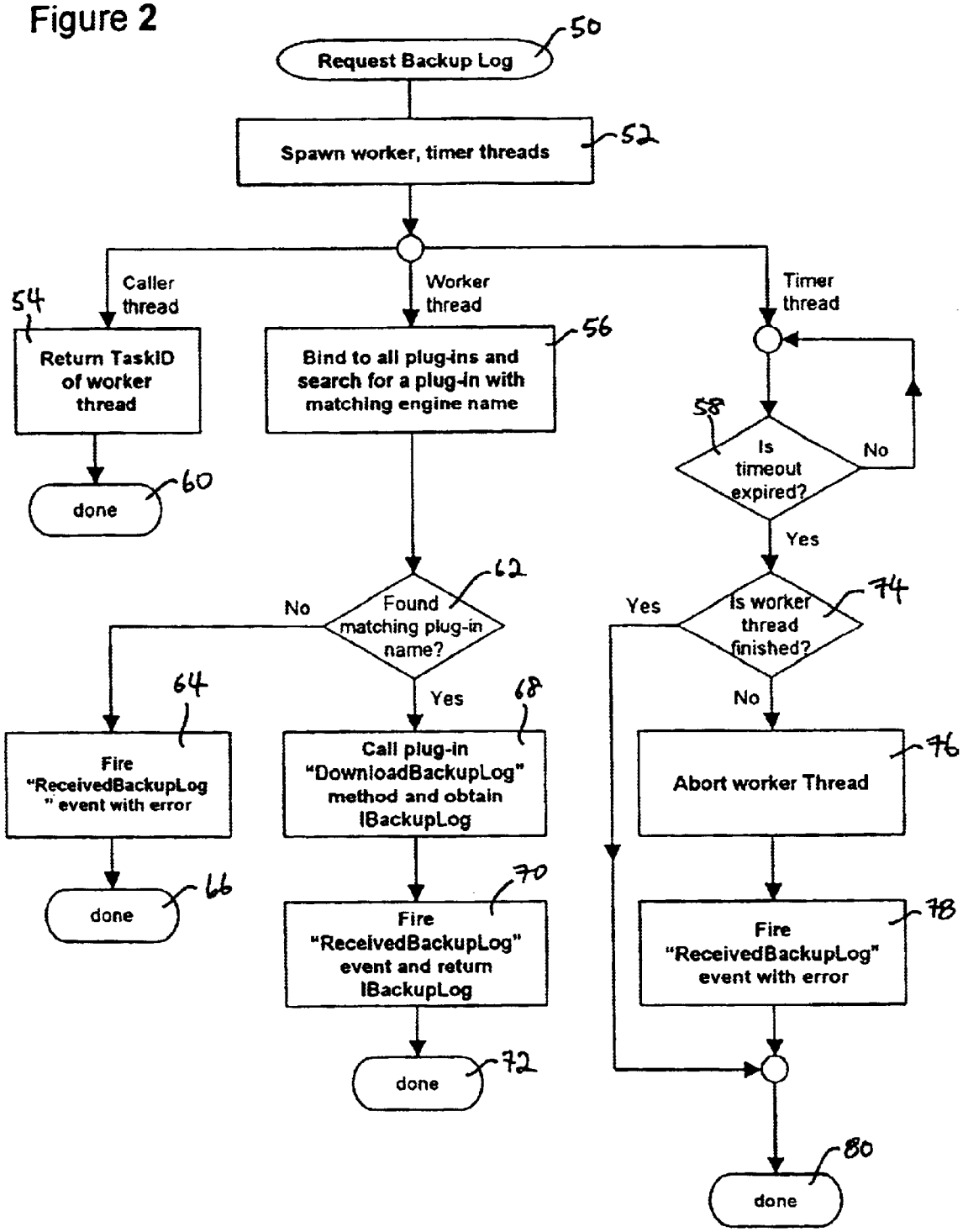
FIG. 2 is a flowchart illustrating the request backup log method in accordance with the invention.

The flowchart shown in FIG. 2 is a description of how, in the preferred embodiment (BX), the "RequestBackupLog" method works and how the "ReceivedBackupLog" event is fired. The following text is an explanation of this flowchart.

When the "RequestBackupLog" method is called, BX spawns two threads, a "worker" thread and a "timer" thread. It then returns the task identification number of the "worker" thread. This task identification number is used as a unique reference number that is intended to match a call to the "RequestBackupLog" method with a "ReceivedBackupLog" event (in case there is more than one call to the method, and there is confusion over which event corresponds to which call). In any case, the task identification number is set to unique thread identification number of the "worker" thread, which is easily obtained from the operating system.

As shown in the flowchart, simultaneous with the other threads of execution, the "timer" thread waits until time out period, specified in a parameter to the "ReceievedBackupLog" method, has expired. When this happens, the timer thread aborts the "worker" thread if it has not already completed. If the worker thread is aborted, the "ReceivedBackupLog" event is fired with the error code parameter set to a non-zero value (to indicate that the request failed).

As shown in the flowchart, simultaneous with the other threads of execution, the "worker" thread accomplishes the major purposes of the request. First, it searches for a backup engine plug-in (BEP) that supports the backup engine name specified in a parameter to the "RequestBackupLog" method. To do this, it looks in the directory where BX is installed, which can be determined from the operating system, and then it examines all files therein that are that are named with a ".BEP" suffix. For each of these files, the file is treated as a dynamically-linked library, and an attempt is made to connect with a COM interface named "IBePlug". If this attempt is successful, and if the "GetEngineName" method of the COM interface named "IBePlug" then returns a backup engine name that matches the desired backup engine name, the BEP is found. Once the BEP has been found, all that remains is to call the "DownloadBackupLog" method, take the canonical backup activity log (CBAL) thereby obtained in the form of a COM interface named "IBackupLog", and then fire the "ReceivedBackupLog" event with a zero error code to return this CBEL. However, in the case that the BEP is not found, then the "ReceivedBackupLog" method is fired with a non-zero zero error code.

ALTERNATIVE EMBODIMENTS

1. Minor modifications could be made to the canonical backup activity log (CBAL) described in this document without changing its fundamental purpose which is to provide a common notation for historical records of backup activity, suitable for the cross-referencing, consolidation and comparison of this data. For example, another date and time format could be used. Or the CBAL could be simplified to contain only the most essential information, that is: the date that the backup attempt or operation took place; the fully qualified host name of the backup client; and the number of bytes that were backed up.

2. The preferred embodiment uses COM in order to provide the dynamic linking capability required to implement extensibility and backup engine plug-ins. A number of other technologies could be used to provide an equivalent dynamic linking capability.

What is claimed is:

1. A method of representing records of data backup activity from a plurality of data backup products in a format that enables this information to be cross-referenced, consolidated, and compared comprising:
   (a) providing a computer network with data backup activity performed by a plurality of data backup products each with its own clients and servers,
   (b) providing a host computer interfaced to said network,
   (c) providing said host computer is running a software device or program that includes said method as one of its software components,
   (d) providing for each data backup product a backup engine plug-in that will obtain records of data backup activity from that data backup product,
   (e) providing records of data backup activity expressed as a canonical backup log containing backup job records including:
      i. a date and time that a data backup attempt or operation took place, and
      ii. a proprietary name of the data backup client, and
      iii. a fully qualified host name of the data backup client, and
      iv. a number of bytes that were backed up or default value, and
      v. a number of files or objects that were backed up or a default value, and
      vi. a proprietary data backup level name or a default value, and
      vii. a canonical data backup level name or a default value, and
      viii. a description of where the information in the data backup job record was obtained, and
      ix. a number of seconds that elapsed during the data backup operation or a default value, and
      x. a number of errors or a default value, and
      xi. a data and time the data backup will expire or default value, and
      xii. a logical target name, and
      xiii. a media label of the storage media the data backup was written to,
   (f) providing a request for the said canonical backup activity log from a said software device or program, whereby said method will make available to said software device or program said canonical backup activity log in response to the asynchronous requests made by said software device or program.

2. A device for obtaining records of data backup activity from a plurality of data backup products in a format that enables this information to be cross-referenced, consolidated, and compared comprising:
   (a) a computer network with data backup activity performed by a plurality of data backup products each with its own clients and servers,
   (b) a host computer interfaced to said network,
   (c) said host computer running a program that includes said device as one of its software components,
   (d) a plurality of data backup products, (e) a specific backup engine plug-in for each said backup product, (f) records of data backup activity from each specific data backup product, (g) canonical backup activity logs including:
  i. a date and time that a data backup attempt or operation took place, and
  ii. a proprietary name of the data backup client, and
  iii. a fully qualified host name of the data backup client, and
  iv. a number of bytes that were backed up or a default value, and
  v. a number of files or objects that were backed up or a default value, and
  vi. a proprietary data backup level name or a default value, and
  vii. a canonical data backup level name or a default value, and
  viii. a description of where the information in the data backup job record was obtained, and
  ix. a number of seconds that elapsed during the data backup operation or a default value, and
  x. a number of errors or a default value, and
  xi. a data and time the data backup will expire or a default value, and
  xii. a logical target name, and
  xiii. a media label of the storage media the data backup was written to, (h) a request for the said canonical backup activity log from a said program, whereby said device will make available to said program said canonical backup activity log in response to the asynchronous requests made by said program.

3. A method for extending the use of the of said invention to obtain records of data backup activity from a previously unsupported backup product, comprising:

(a) providing a computer network with data backup activity performed by a said previously unsupported data backup product with its own clients and server, (b) providing a host computer interfaced to said network, (c) providing said host computer is running a software device or program that includes said method as one of its software components, (d) providing for the said data backup product a backup engine plug-in that will obtain records of data backup activity from said data backup product, (e) providing the said canonical backup activity log format described in claim 1 whereby said method will make available to said software device or program said canonical backup activity log in response to the asynchronous requests made by said software device or program.

4. A method of representing records of data backup activity from one or more data backup products having different formats in a common format, the method comprising:

obtaining records of data backup activity from the one or more data backup products; and generating a canonical backup log containing backup job records corresponding to the records from the one or more data backup products, the canonical backup log including one or more of a date and time that a data backup operation took place, a proprietary name of the data backup client, a fully qualified host name of the data backup client, a number of bytes that were backed up, a number of files or objects that were backed up, a proprietary data backup level name or a default value, a canonical data backup level name or a default value, a description of where the information in the data backup job record was obtained, a number of seconds that elapsed during the data backup operation or a default value, a number of errors or a default value, a data and time the data backup will expire or default value, a logical target name, and a media label of the storage media to which the data backup was written.

5. The method of claim 4, wherein the number of bytes for a particular record in the canonical backup log comprises a default value if the number of bytes is not known.

6. The method of claim 4, wherein the number of objects or files backed up for a particular record in the canonical backup log comprises a default value if the number of objects or files is not known.

7. The method of claim 4, wherein the proprietary data backup level name for a particular record in the canonical backup log comprises a default value.

8. The method of claim 4, wherein the canonical data backup level name for a particular record in the canonical backup log comprises a default value.

9. The method of claim 4, wherein the number of seconds during the data backup for a particular record in the canonical backup log comprises a default value.

10. The method of claim 4, wherein the number of errors for a particular record in the canonical backup log comprises a default value.

11. The method of claim 4, wherein the data and time that the data backup will expire for a particular record in the canonical backup log comprises a default value.

12. The method of claim 4 further comprising providing the canonical backup activity log in response to a request.

13. The method of claim 4 further comprising providing, based on a request for the said canonical backup activity log from a said software device or program, said canonical backup activity log in response to the asynchronous requests made by said software device or program.

14. The method of claim 4, wherein the canonical backup log further comprises a backup job field indicating the number of backup job records in the canonical backup log.

15. A device, being executed by a host computer, for obtaining records of data backup activity from one or more data backup products in a common format, the data backup products each having clients and servers connected to a computer network, the device comprising:

a specific backup engine corresponding to each data backup product that receives the records of data backup activity from each specific data backup product; and means for generating a canonical backup activity log based on the records from the data backup products, the canonical backup activity log including one or more of a date and time that a data backup attempt or operation took place, a proprietary name of the data backup client, a fully qualified host name of the data backup client, a number of bytes that were backed up, a number of files or objects that were backed up, a proprietary data backup level name, a canonical data backup level name, a description of where the information in the data backup job record was obtained, a number of seconds that elapsed during the data backup operation, a number of errors, a data and time the data backup will expire, a logical target name, and a media label of the storage media to which the data backup was written.

16. The device of claim 15, wherein the number of bytes for a particular record in the canonical backup log comprises a default value if the number of bytes is not known.

17. The device of claim 15, wherein the number of objects or files backed up for a particular record in the canonical backup log comprises a default value if the number of objects or files is not known.

18. The device of claim 15, wherein the proprietary data backup level name for a particular record in the canonical backup log comprises a default value.

19. The device of claim 15, wherein the canonical data backup level name for a particular record in the canonical backup log comprises a default value.

20. The device of claim 15, wherein the number of seconds during the data backup for a particular record in the canonical backup log comprises a default value.

21. The device of claim 15, wherein the number of errors for a particular record in the canonical backup log comprises a default value.

22. The device of claim 15, wherein the data and time that the data backup will expire for a particular record in the canonical backup log comprises a default value.

23. The device of claim 15 further comprising providing the canonical backup activity log in response to a request.

24. The device of claim 15 further comprising providing, based on a request for the said canonical backup activity log from a said software device or program, said canonical backup activity log in response to the asynchronous requests made by said software device or program.

25. The device of claim 15, wherein the each specific backup engine comprises a plug-in.

26. The device of claim 15, wherein the canonical backup log further comprises a backup job field indicating the number of backup job records in the canonical backup log.

27. A system for obtaining records of data backup activity from a plurality of data backup products in a common format, the system comprising:
   a computer network with data backup activity performed by one or more data backup products each with its own clients and servers wherein each data backup product generates records of its data backup activity;
   a host computer, connected to the computer network, running a program that includes a canonical backup device; and
   the canonical backup device comprising a specific backup engine for each data backup product that receives the records for the particular data backup product and means for generating a canonical backup activity log wherein the canonical backup activity log includes one or more of a date and time that a data backup attempt or operation took place, a proprietary name of the data backup client, a fully qualified host name of the data backup client, a number of bytes that were backed up, a number of files or objects that were backed up, a proprietary data backup level name, a canonical data backup level name, a description of where the information in the data backup job record was obtained, a number of seconds that elapsed during the data backup operation, a number of errors, a data and time the data backup will expire, a logical target name, and a media label of the storage media to which the data backup was written.

28. The system of claim 27, wherein the number of bytes for a particular record in the canonical backup log comprises a default value if the number of bytes is not known.

29. The system of claim 27, wherein the number of objects or files backed up for a particular record in the canonical backup log comprises a default value if the number of objects or files is not known.

30. The system of claim 27, wherein the proprietary data backup level name for a particular record in the canonical backup log comprises a default value.

31. The system of claim 27, wherein the canonical data backup level name for a particular record in the canonical backup log comprises a default value.

32. The system of claim 27, wherein the number of seconds during the data backup for a particular record in the canonical backup log comprises a default value.

33. The system of claim 27, wherein the number of errors for a particular record in the canonical backup log comprises a default value.

34. The system of claim 27, wherein the data and time that the data backup will expire for a particular record in the canonical backup log comprises a default value.

35. The system of claim 27 further comprising providing the canonical backup activity log in response to a request.

36. The system of claim 27 further comprising providing, based on a request for the said canonical backup activity log from a said software system or program, said canonical backup activity log in response to the asynchronous requests made by said software system or program.

37. The system of claim 27, wherein each specific backup engine comprising a plug-in.

38. The system of claim 27, wherein the canonical backup log further comprises a backup job field indicating the number of backup job records in the canonical backup log.

39. A backup log activity data structure, comprising:
   a date and time field containing the time and data that a data backup operation took place;
   a proprietary name field containing the proprietary name of the data backup client;
   a fully qualified host name field containing the fully qualified host name of the data backup client;
   a bytes field containing a number of bytes that were backed up;
   a file number field containing a number of files or objects that were backed up;
   a proprietary data backup level field containing the proprietary data backup level name;
   a canonical data backup level field containing the canonical data backup level name;
   a description field containing a description of where the information in the data backup job record was obtained;
   a seconds field containing the number of seconds that elapsed during the data backup operation;
   an errors field containing the number of errors that occurred during the data backup operation;
   an expiration field containing a date and time that the data backup will expire;
   a logical target field containing the logical target name; and
   a media label field containing the media label of the storage media to which the data backup was written.

40. The data structure of claim 39, wherein the bytes field for a particular record in the canonical backup log contains a default value.

41. The data structure of claim 39, wherein the file number field for a particular record in the canonical backup log contains a default value.

42. The data structure of claim 39, wherein the proprietary data backup level field for a particular record in the canonical backup log contains a default value.

43. The data structure of claim 39, wherein the canonical data backup level field for a particular record in the canonical backup log contains a default value.

44. The data structure of claim 39, wherein the seconds field for a particular record in the canonical backup log comprises a default value.

45. The data structure of claim 39, wherein the errors field for a particular record in the canonical backup log comprises a default value.

46. The data structure of claim 39, wherein the expiration field for a particular record in the canonical backup log comprises a default value.

47. The data structure of claim 39 further comprising a backup job field containing the number of backup job records in the canonical backup log.

48. A method of representing backup error records of data backup activity from one or more data backup products having different formats in a common format, the method comprising:

obtaining records of data backup activity from the one or more data backup products; and generating a canonical backup error log from the records of the data backup products, the error log containing data backup errors, warning and events in a tabular format having one or more columns and one or more rows.

49. The method of claim 48 further comprising providing the canonical backup error log in response to a request.

50. A device, being executed by a host computer, for obtaining records of data backup activity from one or more data backup products in a common format, the data backup products each having clients and servers connected to a computer network, the device comprising:

a specific backup engine corresponding to each data backup product that receives the records of data backup activity from each specific data backup product, and means for generating a canonical backup error log from the records of the data backup products, the error log containing data backup errors, warning and events in a tabular format having one or more columns and one or more rows.

51. The device of claim 50 further comprising providing the canonical backup error log in response to a request.

52. The device of claim 50, wherein the each specific backup engine comprises a plug-in.

53. A system for obtaining records of data backup activity from a plurality of data backup products in a common format, the system comprising:

a computer network with data backup activity performed by one or more data backup products each with its own clients and servers wherein each data backup product generates records of its data backup activity;

a host computer, connected to the computer network, running a program that includes a canonical backup device; and the canonical backup device comprising a specific backup engine for each data backup product that receives the records for the particular data backup product and means for generating a canonical backup error log from the records of the data backup products, the error log containing data backup errors, warning and events in a tabular format having one or more columns and one or more rows.

54. The system of claim 53 further comprising providing the canonical backup error log in response to a request.

55. The system of claim 53, wherein each specific backup engine comprising a plug-in.

\* \* \* \* \*